(12) United States Patent
Cao et al.

(10) Patent No.: US 11,078,109 B2
(45) Date of Patent: Aug. 3, 2021

(54) GLASS FIBER COMPOSITION, GLASS FIBER AND COMPOSITE MATERIAL THEREOF

(71) Applicant: JUSHI GROUP CO., LTD., Tongxiang (CN)

(72) Inventors: Guorong Cao, Tongxiang (CN); Wenzhong Xing, Tongxiang (CN); Lin Zhang, Tongxiang (CN); Guijiang Gu, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 162 days.

(21) Appl. No.: 16/309,611

(22) PCT Filed: Aug. 24, 2018

(86) PCT No.: PCT/CN2018/102044
§ 371 (c)(1),
(2) Date: Dec. 13, 2018

(87) PCT Pub. No.: WO2019/100782
PCT Pub. Date: May 31, 2019

(65) Prior Publication Data
US 2020/0223746 A1    Jul. 16, 2020

(30) Foreign Application Priority Data
Jun. 22, 2018    (CN) .......................... 201810647969.6

(51) Int. Cl.
| | | |
|---|---|---|
| C03C 13/00 | (2006.01) | |
| C03C 3/087 | (2006.01) | |
| C03C 3/112 | (2006.01) | |
| C03B 37/01 | (2006.01) | |
| C03B 37/022 | (2006.01) | |

(52) U.S. Cl.
CPC ............. *C03C 13/00* (2013.01); *C03B 37/01* (2013.01); *C03C 3/087* (2013.01); *C03C 3/112* (2013.01); *C03B 37/022* (2013.01); *C03C 2213/00* (2013.01)

(58) Field of Classification Search
CPC ......... C03C 13/06; C03C 13/00; C03C 3/087; C03C 3/112; C03C 2213/00
See application file for complete search history.

(56) References Cited

U.S. PATENT DOCUMENTS

| | | | |
|---|---|---|---|
| 4,542,106 A | 9/1985 | Sproull | |
| 5,789,329 A | 8/1998 | Eastes et al. | |
| 8,334,228 B2 * | 12/2012 | Zhang | .................... C03C 13/00 501/38 |
| 8,497,219 B2 | 7/2013 | Buerger | |
| 2011/0136955 A1 * | 6/2011 | Burger | .................... C03C 3/087 524/407 |

FOREIGN PATENT DOCUMENTS

| | | |
|---|---|---|
| CL | 2018002450 A1 | 11/2018 |
| CL | 2018002451 A1 | 11/2018 |
| CL | 2018002633 A1 | 1/2019 |
| CL | 2018002753 A1 | 1/2019 |
| CN | 101767934 A | 7/2010 |
| CN | 102123959 A | 7/2011 |
| CN | 102173594 A | 9/2011 |
| CN | 102849956 A | 1/2013 |
| JP | 2011530475 A | 12/2011 |
| JP | 2015506901 A | 3/2015 |
| RU | 2039019 C1 | 7/1995 |
| WO | 9639362 A1 | 12/1996 |
| WO | 2017063167 A1 | 4/2017 |

OTHER PUBLICATIONS

The World Intellectual Property Organization (WIPO) International Search Report for PCT/CN2018/102044 dated Mar. 27, 2019 2 Pages.

* cited by examiner

*Primary Examiner* — Elizabeth A. Bolden
(74) *Attorney, Agent, or Firm* — Anova Law Group, PLLC

(57) ABSTRACT

A composition for producing a glass fiber, including the following components with corresponding percentage amounts by weight: 54.2-64% $SiO_2$, 11-18% $Al_2O_3$, 20-25.5% CaO, 0.3-3.9% MgO, 0.1-2% of $Na_2O+K_2O$, 0.1-1.5% $TiO_2$, and 0.1-1% total iron oxides including ferrous oxide (calculated as FeO). The weight percentage ratio C1=FeO/(iron oxides−FeO) is greater than or equal to 0.53. The total content of the above components in the composition is greater than 97%. The invention also provides a glass fiber produced using the composition and a composite material including the glass fiber.

18 Claims, No Drawings

GLASS FIBER COMPOSITION, GLASS FIBER AND COMPOSITE MATERIAL THEREOF

CROSS-REFERENCE TO RELATED APPLICATIONS

The present application is a national stage entry under 35 U.S.C. § 371 of International Application No. PCT/CN2018/102044, filed on Aug. 24, 2018, which claims priority to Chinese Patent Application No. 201810647969.6 filed to State Intellectual Property Office on Jun. 22, 2018 and entitled "GLASS FIBER COMPOSITION, GLASS FIBER AND COMPOSITE MATERIAL THEREOF", the disclosures of which are incorporated herein by reference in their entirety.

FIELD OF THE INVENTION

The embodiment of the present invention relates to but not limited to a glass fiber composition, and in particular to a glass fiber, a composition for producing the same, and a composite material comprising the same.

BACKGROUND OF THE INVENTION

Glass fiber is an inorganic fiber material that can be used to reinforce resins to produce composite materials with good performance. E glass is the most common glass composition used to manufacture continuous glass fiber. As science and technology develops, there has been an increasing need to improve the performance of glass fiber reinforced composites. Traditional E glass fiber, which contains a high content of boron, is unable to meet the performance demands in some application fields, such as wind turbine blades, high-performance pipes and automobile parts, due to its relatively loose structure and poor mechanical and corrosion resistance. In addressing the above disadvantages of conventional E-glass fiber, many companies and research institutions have engaged in a number of studies. Some relevant patents with boron-free compositions have been disclosed. For example, a boron-free composition is described in U.S. Pat. No. 4,542,106, and yet a significant amount of $TiO_2$ is added in the composition, resulting in high costs of glass-making raw materials and unfavorable colors of the glass. The U.S. Ser. No. 08/469,836 also provides a boron-free composition that is based on the $SiO_2$—$Al_2O_3$—CaO—MgO quaternary system and substantially free of sulfate and titanium oxide; however, there is no description of technical solutions as to how to improve the glass batch and address the glass melting and forming difficulties arising from the absence of flux agents, so it would be difficult to realize an efficient production with refractory-lined furnaces. Some improvement solutions are provided in other patents to decrease the melting and forming difficulties of the glass. These solutions include, for example: adding greater than 3% wt. of ZnO and $TiO_2$, which would have a very limited application due to the excessively high costs of these two oxides; adding a high amount of MgO and increasing the total amount of alkali earth metal oxides, which could decrease the glass melting difficulty, and yet would meanwhile increase the devitrification risk of the glass and thus have a limited application due to its negative impact on the control of forming difficulty of the glass; and adding less than 8% wt. of blast furnace slags, which could accelerate the melting of the glass batch, but on the other hand would affect the refining of the glass melt and thus have a limited application due to the high difficulty in controlling the glass melting process.

In general, the above-mentioned prior art for producing glass fiber is costly and faces such problems as high difficulties in melting glass batch materials and refining molten glass, poor heat absorption of molten glass, low cooling and hardening rate of molten glass during fiber attenuation, high forming and liquidus temperatures, high crystallization rate, and a narrow temperature range ($\Delta T$) for fiber formation. Thus, the glass fiber production in the prior art generally fails to enable an effective large-scale production at low costs.

SUMMARY OF THE INVENTION

It is one objective of the present disclosure to provide a composition for producing a glass fiber. The resulting glass fiber has a low production cost and a high heat absorption; meanwhile, by introducing iron oxides and regulating the ratio of ferrous oxide to ferric oxide, the composition for producing a glass fiber can not only increase the heat absorption rate of the glass batch and molten glass and enhance the convection of molten glass, thus improving the melting performance at lowered energy consumption; also, it can help to reduce the fiber breakage rate and improve the strength of the glass fiber by increasing the cooling and hardening rate of molten glass during fiber formation, and lower the bubble amount and liquidus temperature of the glass and reduce the glass crystallization rate, thereby broadening the temperature range for fiber formation. Therefore, the composition for producing a glass fiber of the present invention is particularly suitable for large-scale production with refractory-lined furnaces.

To achieve the above objective, in accordance with one embodiment of the present disclosure, there is provided a composition for producing glass fiber, the composition comprising percentage amounts by weight, as follows:

| | |
|---|---|
| $SiO_2$ | 54.2-64% |
| $Al_2O_3$ | 11-18% |
| CaO | 20-25.5% |
| MgO | 0.3-3.9% |
| $Na_2O + K_2O$ | 0.1-2% |
| $TiO_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, and the combined weight percentage of the components listed above is greater than 97%.

In a class of this embodiment, the weight percentage ratio C1=FeO/(iron oxides−FeO) is greater than or equal to 0.66.

In a class of this embodiment, the weight percentage ratio C2=(FeO+CaO−MgO)/$SiO_2$ is greater than 0.33.

In a class of this embodiment, the composition is basically free of $B_2O_3$.

In a class of this embodiment, the combined weight percentage of $SiO_2$, $Al_2O_3$, CaO, MgO, $Na_2O$, $K_2O$, $TiO_2$ and iron oxides is greater than 99%.

In a class of this embodiment, the content range of FeO is greater than or equal to 0.10%.

In a class of this embodiment, the composition comprises the following components expressed as percentage amounts by weight:

| | |
|---|---|
| $SiO_2$ | 57-62% |
| $Al_2O_3$ | 12-17% |
| CaO + MgO | 21-26.5% |
| CaO | 20.5-25% |
| MgO | 0.3-2.7% |
| $Na_2O + K_2O$ | 0.2-2% |
| $Na_2O$ | 0.1-1.2% |
| $K_2O$ | 0.1-1.2% |
| $TiO_2$ | 0.1-1.5% |
| Total iron oxides | 0.1-0.8% |

In addition, the iron oxides include ferrous oxide (calculated as FeO), the range of the weight percentage ratio C1=FeO/(iron oxides−FeO) is greater than or equal to 0.53, and the combined weight percentage of the components listed above is greater than 99%; the composition is basically free of $B_2O_3$.

In a class of this embodiment, the content range of $Al_2O_3$ is 13.6-15% by weight.

In a class of this embodiment, the composition comprises the following components expressed as percentage amounts by weight:

| | |
|---|---|
| $SiO_2$ | 57.5-61% |
| $Al_2O_3$ | 13-15.5% |
| CaO | 21-24.5% |
| MgO | >0.4% and <1% |
| $Na_2O + K_2O$ | 0.1-2% |
| $TiO_2$ | 0.1-1.2% |
| Total iron oxides | 0.1-0.8% |

In addition, the iron oxides include ferrous oxide (calculated as FeO), the range of the weight percentage ratio C1=FeO/(iron oxides−FeO) is greater than or equal to 0.53, and the combined weight percentage of the components listed above is greater than or equal to 99.2%.

In a class of this embodiment, the composition comprises the following components expressed as percentage amounts by weight:

| | |
|---|---|
| $SiO_2$ | 57.5-61% |
| $Al_2O_3$ | 13-15.5% |
| CaO | 21-24.5% |
| MgO | >0.4% and <1% |
| $Na_2O + K_2O$ | 0.1-2% |
| $TiO_2$ | 0.1-1.2% |
| Total iron oxides | 0.1-0.8% |

In addition, the iron oxides include ferrous oxide (calculated as FeO), the range of the weight percentage ratio C1=FeO/(iron oxides−FeO) is greater than or equal to 0.53, and the combined weight percentage of the components listed above is greater than 99%; the composition is basically free of $B_2O_3$.

In a class of this embodiment, the composition further contains less than 0.4% wt. of $Li_2O$.

In a class of this embodiment, the composition further contains 0.15-0.65% wt. of $F_2$.

In a class of this embodiment, the content range of $SiO_2$ is 59-64% by weight.

In a class of this embodiment, the composition is basically free of $P_2O_5$.

In a class of this embodiment, the composition is basically free of $Li_2O$.

In a class of this embodiment, the weight percentage ratio $Na_2O/K_2O$ is greater than 0.65.

In a class of this embodiment, the composition is produced using glass batch materials that have a chemical oxygen demand (COD) value of 500-1200 ppm.

In a class of this embodiment, the composition is produced using glass batch materials that have a $SO_3$/COD ratio of 2-10.

According to another aspect of this invention, a glass fiber produced with the composition for producing a glass fiber is provided.

According to yet another aspect of this invention, a composite material incorporating the glass fiber is provided.

The present invention relates to a glass fiber composition, specifically to a glass fiber composition with a low production cost and a high heat absorption. The composition for producing a glass fiber contains iron oxides, which include ferrous oxide (calculated as FeO) and ferric oxide. By controlling the ratio of ferrous oxide to ferric oxide, expressed as FeO/(iron oxides−FeO) and reasonably adjusting the contents of CaO, MgO and $Al_2O_3$ respectively, the composition can: 1) not only improve the heat absorption of glass batch materials and molten glass, which helps to improve the glass melting performance and reduce energy consumption, but also enhance the convection of molten glass and increase the cooling and hardening rate of molten glass during fiber formation, thus lowering the fiber breakage rate and increasing the glass fiber strength. 2) improve the synergistic effect among the ferrous iron ions, ferric iron ions, calcium ions and magnesium ions, so that a better stacking structure and a higher hardening rate of molten glass are achieved, the liquidus temperature is decreased and the glass crystallization rate is controlled. 3) significantly reduce the fiberizing and refining difficulties of glass and acquire a desired temperature range for fiber formation. Thus, the composition for producing a glass fiber according to the present invention is more suitable for low-cost, large-scale production with refractory-lined furnaces. Furthermore, by controlling the ratio of (FeO+CaO−MgO)/$SiO_2$ for improving the synergistic effect among the ferrous ions, calcium ions, magnesium ions and silicon ions, the present invention further lowers the liquidus temperature and crystallization rate of the glass.

Specifically, the composition for producing a glass fiber according to the present invention comprises the following components expressed as percentage amounts by weight:

| | |
|---|---|
| $SiO_2$ | 54.2-64% |
| $Al_2O_3$ | 11-18% |
| CaO | 20-25.5% |
| MgO | 0.3-3.9% |
| $Na_2O + K_2O$ | 0.1-2% |
| $TiO_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, and the combined weight percentage of the components listed above is greater than 97%.

The effect and content of each component in the composition for producing a glass fiber is described as follows:

The composition contains iron oxides that include ferrous oxide (calculated as FeO) and ferric oxide, featuring the coexistence of Fe2+ and Fe3+ ions. The contents of these two ions and the ratio there between will change in different redox states and temperatures. As Fe3+ and Fe2+ ions have the absorption in the ultraviolet region and in the infrared region respectively, a glass composition with high Fe2+ content is more favorable for the molten glass to absorb the heat during heating up and dissipate the heat when cooling down. Therefore, with a high Fe2+ content, the composition of the present invention can not only increase the heat absorption of molten glass and enhance the convection of molten glass, thus improving the melting performance at lowered energy consumption, but also help to reduce the fiber breakage rate and improve the strength of the glass fiber by increasing the cooling and hardening rate of molten glass during fiber formation. In addition, FeO can also have an effect in reducing the glass crystallization rate.

In addition, iron oxides can reduce the viscosity of glass. However, since the $Fe^{2+}$ and $Fe^{2+}$ ions have a coloring effect, the introduced amount should be limited. Therefore, in the composition for producing a glass fiber of the present invention, the content range of total iron oxides can be 0.1-1%, preferably 0.1-0.8%.

Meanwhile, the weight percentage ratio C1=FeO/(iron oxides−FeO) can be greater than or equal to 0.53, preferably greater than or equal to 0.66, more preferably greater than or equal to 1, even more preferably 0.66-5.66, and still even more preferably 1-5.66. In addition, the FeO content can be greater than or equal to 0.10%, preferably greater than or equal to 0.13%, more preferably greater than or equal to 0.20%, even more preferably 0.13-0.42%, and still even more preferably 0.20-0.42%. In another embodiment, the FeO content is greater than or equal to 0.30%. By contrast, the common general knowledge in the art is biased against a high content of FeO, resulting in a very low FeO amount being used. Take the C1 ratio as used in this invention for example, the value of C1 in the technical solutions of common general knowledge is often lower than 0.40, and even lower than 0.33.

$SiO_2$ is a main oxide forming the glass network and has the effect of stabilizing all the components. In the composition for producing a glass fiber of the present invention, the content range of $SiO_2$ is 54.2-64%. The lower limit is set at 54.2%, so that the resulting glass would have sufficient mechanical properties; and the upper limit is set at 64%, which helps to prevent excessively high viscosity and liquidus temperature that would otherwise cause difficulty for large-scale production. Preferably, the $SiO_2$ content range in this invention can be 57-62%, and more preferably can be 57.5-61%. In another embodiment, the $SiO_2$ content can be 59-64%.

$Al_2O_3$ is another main oxide forming the glass network. When combined with $SiO_2$, it can have a substantive effect on the mechanical properties, especially the modulus, of the glass and a significant effect on preventing glass phase separation and on crystallization resistance. The content range of $Al_2O_3$ in this invention is 11-18%. In order to ensure sufficient mechanical properties, the $Al_2O_3$ content should be not less than 11%. However, the $Al_2O_3$ content should not be excessively high. Its content being over 18% would significantly increase the risks of glass phase separation and crystallization, thus resulting in too high a liquidus temperature and crystallization rate which are not suitable for large-scale production. Preferably, the $Al_2O_3$ content can be 12-17%, more preferably 13-15.5%, and even more preferably 13.6-15%.

CaO is a modifying oxide of the glass network. It helps to regulate the glass viscosity, improve the chemical stability and mechanical strength of glass, and accelerate the fiberizing rate of the glass by increasing the hardening rate of molten glass. The content range of CaO in this invention is 20-25.5%. If the content is too low, the above-mentioned effects will not be significant; if the content is too great, the hardening rate of molten glass will become excessively low, causing the difficulty in fiber formation and increased crystallization risk. Preferably, the CaO content can be 20.5-25%, more preferably 21-24.5%.

MgO primarily regulates the glass viscosity and controls the glass crystallization. The content range of MgO in this invention is 0.3-3.9%. In this invention, a certain amount of MgO is mixed with CaO and $Al_2O_3$. With such mixture, calcium ions would provide considerable free oxygen while filling in the network gaps, and would produce a synergistic effect in structural stacking together with magnesium ions and aluminum ions. Thus, a more compact stacking structure would be achieved, a mixture of crystal phases is obtained during the crystallization process that consists of wollastonite ($CaSiO_3$), diopside ($CaMgSi_2O_6$) and anorthite ($CaAl_2Si_2O_8$), and the crystallization risk will be reduced; also, the hardening rate of molten glass as well as the cooling effect during fiber attenuation will be optimized. Preferably, the MgO content can be 0.3-2.7%, more preferably 0.75-2%. In another embodiment, the MgO content can be greater than 0.4% and less than 1%.

Meanwhile, in order to increase the fiberizing rate and the hardening rate of molten glass, reduce the crystallization rate and enhance the cooling effect on the fiber cones, the weight percentage ratio C2=(FeO+CaO−MgO)/$SiO_2$ in the present invention can be greater than 0.33, preferably greater than or equal to 0.34, more preferably 0.34-0.43, and even more preferably 0.34-0.40. However, the ratio C2 should not be too high, otherwise the strength and crystallization performance of the resulting glass fiber would be affected.

Both $K_2O$ and $Na_2O$ can reduce glass viscosity and are good fluxing agents. They can also provide considerable free oxygen and produce a good synergistic effect in combination with ferrous ions, aluminum ions and magnesium ions, so as to create a more compact stacking structure and a better cooling effect on the fiber cones. In the composition for producing a glass fiber of the present invention, the total content range of $Na_2O+K_2O$ can be 0.1-2%, preferably can be 0.15-1%, and more preferably can be 0.15-0.85%. Further, the content range of $Na_2O$ can be 0.1-1.2% and the content range of $K_2O$ can be 0.1-1.2%. Besides, in order to ensure the cooling effect on the fiber cones and improve the forming properties of glass fiber, the weight percentage ratio $Na_2O/K_2O$ can be greater than 0.65, preferably greater than or equal to 0.8%, more preferably greater than or equal to 1.

$TiO_2$ can not only reduce the glass viscosity at high temperatures, but also has a certain fluxing effect. Therefore, in the composition for producing a glass fiber of the present invention, the content range of $TiO_2$ is 0.1-1.5%, preferably 0.1-1.2%, and more preferably 0.1-0.8%. Meanwhile, the combined weight percentage of $SiO_2+TiO_2$ is greater than 59.2%, preferably greater than or equal to 59.4%.

Meanwhile, the combined weight percentage of the said $SiO_2$, $Al_2O_3$, CaO, MgO, $Na_2O$, $K_2O$, $TiO_2$ and iron oxides in the present invention is greater than 97%, preferably greater than 99%, more preferably greater than or equal to 99.2%, and even more preferably greater than or equal to 99.4%. In addition to the main components above, the glass fiber composition of the present invention can also include small amounts of other components.

Furthermore, in order to control the production costs and be more environmentally friendly, the composition for producing a glass fiber of the present invention can be basically free of $B_2O_3$.

Furthermore, in order to control the production costs and be more environmentally friendly, the composition for producing a glass fiber of the present invention can be basically free of $P_2O_5$.

Furthermore, in order to control the production costs, the composition for producing a glass fiber of the present invention can be basically free of $Li_2O$. In another embodiment, the present invention can include $Li_2O$ with a content less than 0.4%.

Furthermore, the composition for producing a glass fiber of the present invention can include $F_2$ with a weight percentage less than 0.8%. As there is a certain synergistic effect among $F_2$, ferrous iron ions and ferric iron ions, the amount of ferrous ions can be adjusted. Preferably, the present invention can include $F_2$ with a content of 0.1-0.7%, more preferably 0.15-0.65%, and even more preferably 0.25-0.65%. In another embodiment, the composition for producing a glass fiber of the present invention is basically free of $F_2$.

Furthermore, the composition is produced using glass batch materials that have a COD value of 500-1200 ppm. The COD value of traditional glass batch materials is very low, generally lower than 250 ppm, or even lower than 200 ppm. Preferably, the COD value of the glass batch materials in the present invention can be 600-1200 ppm, more preferably 650-1150 ppm.

In the present invention, the redox state can be controlled by using a high COD value to acquire a high $Fe^{2+}$ amount, which can not only increase the heat absorption of molten glass and enhance the convection of molten glass, thus improving the melting performance at lowered energy consumption, but also can help to reduce the fiber breakage rate and improve the strength of the glass fiber by increasing the cooling and hardening rate of molten glass during fiber formation.

Further, the composition for producing a glass fiber in the present invention can be produced using glass batch materials with a $SO_3$/COD ratio of 2-10. Preferably, the range of the $SO_3$/COD ratio can be 2.5-9, more preferably 2.5-8.

In addition, the expression "basically free of" or its variants in this invention means the component in question is present in the composition only in a trace amount. For example, it can be introduced with raw materials in the form of impurities with a content of 0-0.03%, and in most cases of 0-0.01%.

In the composition for producing a glass fiber of the present invention, the beneficial effects produced by the aforementioned selected ranges of the components will be explained by way of examples through the specific experimental data.

The following are examples of preferred content ranges of the components contained in the composition for producing a glass fiber according to the present invention.

Composition 1

The composition for producing a glass fiber according to the present invention comprises the following components expressed as percentage amounts by weight:

| | |
|---|---|
| $SiO_2$ | 54.2-64% |
| $Al_2O_3$ | 11-18% |
| CaO | 20-25.5% |
| MgO | 0.3-3.9% |
| $Na_2O + K_2O$ | 0.1-2% |
| $TiO_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.66, and the combined weight percentage of the components listed above is greater than 97%

Composition 2

The composition for producing a glass fiber according to the present invention comprises the following components expressed as percentage amounts by weight:

| | |
|---|---|
| $SiO_2$ | 54.2-64% |
| $Al_2O_3$ | 11-18% |
| CaO | 20-25.5% |
| MgO | 0.3-3.9% |
| $Na_2O + K_2O$ | 0.1-2% |
| $TiO_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, the range of the weight percentage ratio C2=(FeO+CaO−MgO)/$SiO_2$ is greater than 0.33, and the combined weight percentage of the components listed above is greater than 97%.

Composition 3

The composition for producing a glass fiber according to the present invention comprises the following components expressed as percentage amounts by weight:

| | |
|---|---|
| $SiO_2$ | 54.2-64% |
| $Al_2O_3$ | 11-18% |
| CaO | 20-25.5% |
| MgO | 0.3-3.9% |
| $Na_2O + K_2O$ | 0.1-2% |
| $TiO_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, the combined weight percentage of the components listed above is greater than 97%, and the composition is basically free of $B_2O_3$.

Composition 4

The composition for producing a glass fiber according to the present invention comprises the following components expressed as percentage amounts by weight:

| | |
|---|---|
| $SiO_2$ | 54.2-64% |
| $Al_2O_3$ | 11-18% |
| CaO | 20-25.5% |
| MgO | 0.3-3.9% |
| $Na_2O + K_2O$ | 0.1-2% |
| $TiO_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, and the combined weight percentage of $SiO_2$, $Al_2O_3$, CaO, MgO, $Na_2O$, $K_2O$, $TiO_2$ and iron oxides is greater than 99%.

Composition 5

The composition for producing a glass fiber according to the present invention comprises the following components expressed as percentage amounts by weight:

| | |
|---|---|
| SiO$_2$ | 54.2-64% |
| Al$_2$O$_3$ | 11-18% |
| CaO | 20-25.5% |
| MgO | 0.3-3.9% |
| Na$_2$O + K$_2$O | 0.1-2% |
| TiO$_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, the content range of FeO is greater than or equal to 0.10%, and the combined weight percentage of the components listed above is greater than 97%.

Composition 6

The composition for producing a glass fiber according to the present invention comprises the following components expressed as percentage amounts by weight:

| | |
|---|---|
| SiO$_2$ | 57-62% |
| Al$_2$O$_3$ | 12-17% |
| CaO + MgO | 21-26.5% |
| CaO | 20.5-25% |
| MgO | 0.3-2.7% |
| Na$_2$O + K$_2$O | 0.2-2% |
| Na$_2$O | 0.1-1.2% |
| K$_2$O | 0.1-1.2% |
| TiO$_2$ | 0.1-1.5% |
| Total iron oxides | 0.1-0.8% |

In addition, the iron oxides include ferrous oxide (calculated as FeO), the range of the weight percentage ratio C1=FeO/(iron oxides−FeO) is greater than or equal to 0.53, the combined weight percentage of the components listed above is greater than 99%, and the composition is basically free of B$_2$O$_3$.

Composition 7

The composition for producing a glass fiber according to the present invention comprises the following components expressed as percentage amounts by weight:

| | |
|---|---|
| SiO$_2$ | 57.5-61% |
| Al$_2$O$_3$ | 13-15.5% |
| CaO | 21-24.5% |
| MgO | >0.4% and <1% |
| Na$_2$O + K$_2$O | 0.1-2% |
| TiO$_2$ | 0.1-1.2% |
| Total iron oxides | 0.1-0.8% |

In addition, the iron oxides include ferrous oxide (calculated as FeO), the range of the weight percentage ratio C1=FeO/(iron oxides−FeO) is greater than or equal to 0.53, the combined weight percentage of the components listed above is greater than 99%, and the composition is basically free of B$_2$O$_3$.

Composition 8

The composition for producing a glass fiber according to the present invention comprises the following components expressed as percentage amounts by weight:

| | |
|---|---|
| SiO$_2$ | 54.2-64% |
| Al$_2$O$_3$ | 11-18% |
| CaO | 20-25.5% |
| MgO | 0.3-3.9% |
| Na$_2$O + K$_2$O | 0.1-2% |
| TiO$_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, the combined weight percentage of the components listed above is greater than 97%, and the composition contains F$_2$ with a content range of 0.15-0.65% by weight.

Composition 9

The composition for producing a glass fiber according to the present invention comprises the following components expressed as percentage amounts by weight:

| | |
|---|---|
| SiO$_2$ | 54.2-64% |
| Al$_2$O$_3$ | 11-18% |
| CaO | 20-25.5% |
| MgO | 0.3-3.9% |
| Na$_2$O + K$_2$O | 0.1-2% |
| TiO$_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, the combined weight percentage of the components listed above is greater than 97%, and the composition is basically free of B$_2$O$_3$, P$_2$O$_5$ and Li$_2$O.

Composition 10

The composition for producing a glass fiber according to the present invention comprises the following components expressed as percentage amounts by weight:

| | |
|---|---|
| SiO$_2$ | 54.2-64% |
| Al$_2$O$_3$ | 11-18% |
| CaO | 20-25.5% |
| MgO | 0.3-3.9% |
| Na$_2$O + K$_2$O | 0.1-2% |
| TiO$_2$ | 0.1-1.5% |
| Total iron oxides | 0.1-1% |

In addition, the iron oxides include ferrous oxide (calculated as FeO), the range of the weight percentage ratio C1=FeO/(iron oxides−FeO) is greater than or equal to 0.53, and the combined weight percentage of the components listed above is greater than 97%; the composition is produced using glass batch materials that have a COD value of 500-1200 ppm and a SO$_3$/COD ratio of 2-10.

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the composition for producing a glass fiber expressed as percentage amounts by weight are: 54.2-64% $SiO_2$, 11-18% $Al_2O_3$, 20-25.5% CaO, 0.3-3.9% MgO, 0.1-2% $Na_2O+K_2O$, 0.1-1.5% $TiO_2$, 0.1-1% total iron oxides including ferrous oxide (calculated as FeO), wherein the range of the weight percentage ratio C1=FeO/(iron oxides−FeO) is greater than or equal to 0.53, and the range of the combined weight percentage of these components is greater than 97%. The composition has a low production cost and a high heat absorption. It can not only increase the heat absorption of the glass batch and molten glass and enhance the convection of molten glass, thus improving the melting performance at lowered energy consumption; it can also increase the cooling and hardening rate of molten glass during fiber formation, lower the bubble amount and liquidus temperature of the glass and reduce the glass crystallization rate, thereby broadening the temperature range for fiber formation. Therefore, the composition is particularly suitable for large-scale production of glass fiber with refractory-lined furnaces.

The specific content values of $SiO_2$, $Al_2O_3$, CaO, MgO, $Na_2O$, $K_2O$, $TiO_2$, iron oxides and FeO in the composition for producing a glass fiber of the present invention are selected to be used in the examples, and comparisons with traditional E-glass fiber composition ("B1") and an improved E-glass fiber composition ("B2") as described in the patent WO96/39362 are made in terms of the following seven property parameters, (1) Forming temperature, the temperature at which the glass melt has a viscosity of $10^3$ poise.

(2) Liquidus temperature, the temperature at which the crystal nucleuses begin to form when the glass melt cools off—i.e., the upper limit temperature for glass crystallization.

(3) ΔT value, the difference between the forming temperature and the liquidus temperature, indicating the temperature range at which fiber drawing can be performed.

(4) Tensile strength, the maximum tensile stress that the glass fiber can withstand, which is to be measured on impregnated glass roving as per ASTM D2343.

(5) Crystallization area ratio, to be determined in a procedure set out as follows: Cut the bulk glass appropriately to fit in with a porcelain boat trough and then place the cut glass bar sample into the porcelain boat. Put the porcelain boat with the glass bar sample into a gradient furnace for crystallization and keep the sample for heat preservation for 6 hours. Take the boat with the sample out of the gradient furnace and air-cool it to room temperature. Finally, examine and measure the amounts and dimensions of crystals on the surfaces of each sample within the temperature range of 1000-1150° C. from a microscopic view by using an optical microscope, and then calculate the area ratio of crystallization. A high area ratio would mean a high crystallization tendency and high crystallization rate.

(6) Amount of bubbles, to be determined in a procedure set out as follows: Use specific moulds to compress the glass batch materials in each example into samples of same dimension, which will then be placed on the sample platform of a high temperature microscope. Heat the samples according to standard procedures up to the pre-set spatial temperature 1500° C. and then directly cool them off with the cooling hearth of the microscope to the ambient temperature without heat preservation. Finally, each of the glass samples is examined under a polarizing microscope to determine the amount of bubbles in the samples. A bubble is identified according to a specific amplification of the microscope.

(7) Cool-down time, to be measured as follows: Pour a high temperature molten glass at 1550° C. into a stainless steel mould with a certain thickness, detect the changing temperatures on the surface of the glass bulk using a plurality of infrared temperature instrument sets, and record and calculate the time for the initial molten glass to cool down to a temperature of around 100° C. A short cool-down time means a high rate of the cooling and hardening of molten glass, and vice versa.

The aforementioned seven parameters and the methods of measuring them are well-known to one skilled in the art. Therefore, these parameters can be effectively used to explain the properties of the composition for producing a glass fiber of the present invention.

The specific procedures for the experiments are as follows: Each component can be acquired from the appropriate raw materials. Mix the raw materials in the appropriate proportions so that each component reaches the final expected weight percentage. The mixed batch melts and the molten glass refines. Then the molten glass is drawn out through the tips of the bushings, thereby forming the glass fiber. The glass fiber is attenuated onto the rotary collet of a winder to form cakes or packages. Of course, conventional methods can be used to deep process these glass fibers to meet the expected requirement.

Comparisons of the property parameters of the examples of the composition for producing a glass fiber according to the present invention with those of the traditional E glass and improved E glass are further made below by way of tables, where the component contents of the composition for producing a glass fiber are expressed as weight percentage. What needs to be made clear is that the total amount of the components in the examples is slightly less than 100%, and it should be understood that the remaining amount is trace impurities or a small amount of components which cannot be analyzed.

TABLE 1A

|  |  | A1 | A2 | A3 | A4 | A5 |
|---|---|---|---|---|---|---|
| Component | $SiO_2$ | 59.2 | 59.2 | 59.2 | 61.0 | 57.5 |
|  | $Al_2O_3$ | 14.3 | 14.3 | 14.3 | 13.0 | 15.5 |
|  | CaO | 23.3 | 22.7 | 22.1 | 22.8 | 23.8 |
|  | MgO | 0.90 | 1.5 | 2.1 | 0.95 | 1.0 |
|  | $TiO_2$ | 0.50 | 0.50 | 0.50 | 0.35 | 0.40 |
|  | $B_2O_3$ | — | — | — | — | — |
|  | Total iron oxides | 0.45 | 0.45 | 0.45 | 0.50 | 0.42 |
|  | FeO | 0.25 | 0.25 | 0.25 | 0.35 | 0.30 |
|  | $K_2O$ | 0.40 | 0.40 | 0.40 | 0.30 | 0.30 |

TABLE 1A-continued

|  |  | A1 | A2 | A3 | A4 | A5 |
|---|---|---|---|---|---|---|
|  | Na$_2$O | 0.40 | 0.40 | 0.40 | 0.50 | 0.50 |
|  | F$_2$ | 0.35 | 0.35 | 0.35 | 0.40 | 0.38 |
|  | Li$_2$O | — | — | — | — | — |
| Ratio | C1 | 1.25 | 1.25 | 1.25 | 2.33 | 2.50 |
|  | C2 | 0.383 | 0.362 | 0.342 | 0.364 | 0.405 |
| Parameter | Forming temperature/° C. | 1265 | 1267 | 1268 | 1269 | 1268 |
|  | Liquidus temperature/° C. | 1163 | 1166 | 1169 | 1167 | 1265 |
|  | ΔT/° C. | 102 | 101 | 99 | 102 | 103 |
|  | Tensile strength/MPa | 2380 | 2330 | 2290 | 2340 | 2360 |
|  | Crystallization area ratio/% | 6 | 8 | 10 | 8 | 8 |
|  | Amount of bubbles/pcs | 6 | 7 | 7 | 10 | 8 |

TABLE 1B

|  |  | A6 | A7 | A8 | A9 | A10 |
|---|---|---|---|---|---|---|
| Component | SiO$_2$ | 59.0 | 59.0 | 59.2 | 59.4 | 57.5 |
|  | Al$_2$O$_3$ | 14.1 | 14.2 | 14.6 | 13.6 | 17.0 |
|  | CaO | 23.3 | 25.0 | 21.6 | 22.4 | 20.0 |
|  | MgO | 0.90 | 0.30 | 2.1 | 2.7 | 3.9 |
|  | TiO$_2$ | 1.0 | 0.15 | 0.45 | 0.40 | 0.20 |
|  | B$_2$O$_3$ | — | — | — | — | — |
|  | Total iron oxides | 0.45 | 0.45 | 0.40 | 0.35 | 0.40 |
|  | FeO | 0.25 | 0.25 | 0.25 | 0.27 | 0.13 |
|  | K$_2$O | 0.30 | 0.30 | 0.35 | 0.35 | 0.35 |
|  | Na$_2$O | 0.45 | 0.30 | 0.45 | 0.45 | 0.40 |
|  | F$_2$ | 0.30 | 0.10 | 0.65 | 0.15 | 0.05 |
|  | Li$_2$O | — | — | — | — | — |
| Ratio | C1 | 1.25 | 1.25 | 1.67 | 3.38 | 0.48 |
|  | C2 | 0.384 | 0.423 | 0.334 | 0.336 | 0.282 |
| Parameter | Forming temperature/° C. | 1262 | 1268 | 1263 | 1264 | 1280 |
|  | Liquidus temperature/° C. | 1165 | 1173 | 1165 | 1163 | 1186 |
|  | ΔT/° C. | 97 | 95 | 98 | 101 | 94 |
|  | Tensile strength/MPa | 2340 | 2250 | 2360 | 2400 | 2200 |
|  | Crystallization area ratio/% | 8 | 12 | 7 | 6 | 18 |
|  | Amount of bubbles/pcs | 6 | 8 | 6 | 5 | 13 |

TABLE 1C

|  |  | A11 | A12 | A13 | A14 | A15 |
|---|---|---|---|---|---|---|
| Component | SiO$_2$ | 59.2 | 60.0 | 59.3 | 59.3 | 58.5 |
|  | Al$_2$O$_3$ | 14.2 | 12.0 | 14.3 | 14.4 | 14.6 |
|  | CaO | 23.5 | 22.6 | 22.6 | 23.2 | 23.2 |
|  | MgO | 0.90 | 3.0 | 1.5 | 1.1 | 0.75 |
|  | TiO$_2$ | 0.10 | 0.50 | 0.30 | 0.45 | 1.50 |
|  | B$_2$O$_3$ | — | — | — | — | — |
|  | Total iron oxides | 0.46 | 0.45 | 0.40 | 0.30 | 0.45 |
|  | FeO | 0.16 | 0.30 | 0.30 | 0.24 | 0.35 |
|  | K$_2$O | 0.50 | 0.50 | 0.40 | 0.60 | 0.35 |
|  | Na$_2$O | 0.30 | 0.30 | 0.70 | 0.15 | 0.45 |
|  | F$_2$ | 0.44 | 0.45 | 0.30 | 0.15 | — |
|  | Li$_2$O | — | — | — | 0.15 | — |
| Ratio | C1 | 0.53 | 2.00 | 3.00 | 4.00 | 3.50 |
|  | C2 | 0.381 | 0.332 | 0.361 | 0.377 | 0.390 |
| Parameter | Forming temperature/° C. | 1268 | 1268 | 1261 | 1263 | 1258 |
|  | Liquidus temperature/° C. | 1171 | 1168 | 1166 | 1171 | 1163 |
|  | ΔT/° C. | 97 | 100 | 95 | 92 | 95 |
|  | Tensile strength/MPa | 2250 | 2290 | 2350 | 2400 | 2410 |
|  | Crystallization area ratio/% | 10 | 9 | 8 | 12 | 6 |
|  | Amount of bubbles/pcs | 8 | 9 | 6 | 7 | 6 |

TABLE 1D

|  |  | A16 | A17 | A18 | B1 | B2 |
|---|---|---|---|---|---|---|
| Component | $SiO_2$ | 59.4 | 59.4 | 59.4 | 54.16 | 59.45 |
|  | $Al_2O_3$ | 14.1 | 14.1 | 14.1 | 14.32 | 13.48 |
|  | CaO | 23.3 | 23.3 | 23.3 | 22.12 | 22.69 |
|  | MgO | 0.95 | 0.95 | 0.95 | 0.41 | 3.23 |
|  | $TiO_2$ | 0.45 | 0.45 | 0.45 | 0.34 | 0.04 |
|  | $B_2O_3$ | — | — | — | 7.26 | 0 |
|  | Total iron oxides | 0.40 | 0.40 | 0.40 | 0.39 | 0.36 |
|  | FeO | 0.31 | 0.20 | 0.11 | 0.10 | 0.09 |
|  | $K_2O$ | 0.40 | 0.40 | 0.40 | 0.25 | 0.63 |
|  | $Na_2O$ | 0.40 | 0.40 | 0.40 | 0.45 | 0.03 |
|  | $F_2$ | 0.40 | 0.40 | 0.40 | 0.29 | 0.04 |
|  | $Li_2O$ | — | — | — | — | — |
| Ratio | C1 | 3.44 | 1.00 | 0.38 | 0.34 | 0.33 |
|  | C2 | 0.381 | 0.380 | 0.378 | 0.403 | 0.329 |
| Parameter | Forming temperature/° C. | 1262 | 1264 | 1265 | 1175 | 1264 |
|  | Liquidus temperature/° C. | 1162 | 1167 | 1177 | 1075 | 1193 |
|  | ΔT/° C. | 100 | 97 | 88 | 100 | 71 |
|  | Tensile strength/MPa | 2410 | 2290 | 2190 | 1982 | 2191 |
|  | Crystallization area ratio/% | 5 | 8 | 15 | 8 | 19 |
|  | Amount of bubbles/pcs | 5 | 7 | 10 | 10 | 13 |
|  | Cool-down time/s | 5.0 | 6.0 | 8.5 | 9.0 | 10.0 |

It can be seen from the values in the above tables that, compared with the traditional E glass, the glass fiber composition of the present invention has the following advantages: (1) much higher tensile strength; (2) much lower cost; (3) higher cooling and hardening rate of molten glass; (4) smaller amount of bubbles, which indicates a better refining of molten glass.

Compared with improved E glass, the composition for producing a glass fiber of the present invention has the following advantages: (1) higher tensile strength; (2) higher cooling and hardening rate of molten glass; (3) much lower liquidus temperature and much lower crystallization area ratio, which indicate a low upper limit temperature for crystallization as well as a low crystallization rate and thus help to reduce the crystallization risk and improve the fiber drawing efficiency; (4) smaller amount of bubbles, which indicates a better refining of molten glass.

Therefore, it can be seen from the above that, compared with the traditional E glass and improved E glass, the composition for producing a glass fiber of the present invention has made a breakthrough in terms of tensile strength, cooling and hardening rate of molten glass, crystallization temperature and crystallization rate. Thus, the overall technical solution of the present invention enables an easy achievement of large-scale production with refractory-lined furnaces.

The glass fiber composition according to the present invention can be used for making glass fibers having the aforementioned properties.

The glass fiber composition according to the present invention can be used in combination with one or more organic and/or inorganic materials for preparing composite materials having excellent performances, such as glass fiber reinforced base materials.

The contents described above can be implemented individually or combined with each other in various manners, and all of these variants fall into the scope of protection of the present invention.

Finally, what should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by such phrase as "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE PRESENT INVENTION

The glass fiber composition of the present invention introduces iron oxides, and controls the ratio of ferrous oxide and ferric oxide. The composition can not only increase the heat absorption of the glass batch and molten glass and improve the melting performance at lowered energy consumption; it can also enhance the convection of molten glass, and increase the cooling and hardening rate of molten glass during fiber formation, decrease wire fracture and enhance the glass fiber strength, lower the bubble amount and liquidus temperature of the glass, and improve the glass crystallization rate, thereby broadening the range for fiber formation. Compared with the existing high performance glass, the composition for producing a glass fiber of the present invention has made a breakthrough in terms of tensile strength, cooling and hardening rate of molten glass, crystallization temperature and crystallization rate and clarity. Thus, the tensile strength is greatly increased, the cooling and hardening rate is further improved, crystallization temperature and crystallization rate are decreased, and the bubble amount is also decreased. Therefore, the overall technical solution of the present invention is suitable for large-scale furnace production with low cost.

What is claimed is:

1. A composition for producing a glass fiber, comprising the following components with corresponding percentage amounts by weight:

| | |
|---|---|
| $SiO_2$ | 54.2-64% |
| $Al_2O_3$ | 11-18% |
| CaO | 20-25.5% |
| MgO | 0.3-3.9% |
| $Na_2O + K_2O$ | 0.1-2% |
| $TiO_2$ | 0.1-1.5% |
| Total iron oxides | 0.1-1% | wherein
the total content of the components listed above is greater than 97%;
the iron oxides include ferrous oxide (calculated as FeO);
a weight percentage of FeO is greater than or equal to 0.10%;
a weight percentage ratio C1=FeO/(iron oxides−FeO) is greater than or equal to 0.53; and
a weight percentage ratio C2=(FeO+CaO−MgO)/$SiO_2$ is greater than 0.33.

2. The composition of claim 1, comprising 13.6-15 wt. % of $Al_2O_3$.

3. The composition of claim 1, further comprising less than 0.4 wt. % of $Li_2O$.

4. The composition of claim 1, further comprising 0.15-0.65 wt. % of $F_2$.

5. The composition of claim 1, comprising 59-64 wt. % of $SiO_2$.

6. The composition of claim 1, being basically free of $B_2O_3$.

7. The composition of claim 1, being basically free of $P_2O_5$.

8. The composition of claim 1, being basically free of $Li_2O$.

9. The composition of claim 1, comprising the following components with corresponding percentage amounts by weight:

| | |
|---|---|
| $SiO_2$ | 57-62% |
| $Al_2O_3$ | 12-17% |
| CaO + MgO | 21-26.5% |
| CaO | 20.5-25% |
| MgO | 0.3-2.7% |
| $Na_2O + K_2O$ | 0.2-2% |
| $Na_2O$ | 0.1-1.2% |
| $K_2O$ | 0.1-1.2% |
| $TiO_2$ | 0.1-1.5% |
| Total iron oxides | 0.1-0.8% | wherein
the combined weight percentage of the components listed above is greater than 99%;
the iron oxides include ferrous oxide (calculated as FeO);
a weight percentage of FeO is greater than or equal to 0.10%;
a weight percentage ratio C1=FeO/(iron oxides−FeO) is greater than or equal to 0.53;
a weight percentage ratio C2=(FeO+CaO−MgO)/$SiO_2$ is greater than 0.33; and
the composition is basically free of $B_2O_3$.

10. The composition of claim 1, comprising the following components with corresponding percentage amounts by weight:

| | |
|---|---|
| $SiO_2$ | 57.5-61% |
| $Al_2O_3$ | 13-15.5% |
| CaO | 21-24.5% |
| MgO | >0.4% and <1% |
| $Na_2O + K_2O$ | 0.1-2% |
| $TiO_2$ | 0.1-1.2% |
| Total iron oxides | 0.1-0.8% | wherein
the combined weight percentage of the components listed above is greater than or equal to 99.2%;
the iron oxides include ferrous oxide (calculated as FeO);
a weight percentage of FeO is greater than or equal to 0.10%;
a weight percentage ratio C1=FeO/(iron oxides−FeO) is greater than or equal to 0.53; and
a weight percentage ratio C2=(FeO+CaO−MgO)/$SiO_2$ is greater than 0.33.

11. The composition of claim 1, comprising the following components with corresponding percentage amounts by weight:

| | |
|---|---|
| $SiO_2$ | 57.5-61% |
| $Al_2O_3$ | 13-15.5% |
| CaO | 21-24.5% |
| MgO | >0.4% and <1% |
| $Na_2O + K_2O$ | 0.1-2% |
| $TiO_2$ | 0.1-1.2% |
| Total iron oxides | 0.1-0.8% | wherein
the combined weight percentage of the components listed above is greater than 99%;
the iron oxides include ferrous oxide (calculated as FeO);
a weight percentage of FeO is greater than or equal to 0.10%;
a weight percentage ratio C1=FeO/(iron oxides−FeO) is greater than or equal to 0.53;
a weight percentage ratio C2=(FeO+CaO−MgO)/$SiO_2$ is greater than 0.33; and
the composition is basically free of $B_2O_3$.

12. The composition of claim 1, wherein the combined weight percentage of $SiO_2$, $Al_2O_3$, CaO, MgO, $Na_2O$, $K_2O$, $TiO_2$ and iron oxides is greater than 99%.

13. The composition of claim 1, wherein a weight percentage ratio C1=FeO/(iron oxides−FeO) is greater than or equal to 0.66.

14. The composition of claim 1, wherein a weight percentage ratio $Na_2O/K_2O$ is greater than 0.65.

15. The composition of claim 1, being produced using glass batch materials with a chemical oxygen demand (COD) value of 500-1200 ppm.

16. The composition of claim 1, being produced using glass batch materials with a $SO_3$/COD ratio of 2-10;
wherein COD refers to chemical oxygen demand.

17. A glass fiber, being produced using the composition of claim 1.

18. A composite material, comprising the glass fiber of claim 17.

* * * * *